United States Patent [19]

Bourgeois et al.

[11] Patent Number: 4,675,853
[45] Date of Patent: Jun. 23, 1987

[54] METHOD OF IMPROVING THE RESTORATION OF IMAGES SUPPLIED BY A LATERAL SONAR AND A DEVICE FOR IMPLEMENTING SAME

[75] Inventors: Aline Bourgeois, Paris; Didier Jan, Locmaria-Plouzane, both of France

[73] Assignee: Institut Francais Du Petrole, Rueil-Malmaison, France

[21] Appl. No.: 814,753

[22] Filed: Dec. 30, 1985

[30] Foreign Application Priority Data

Dec. 28, 1984 [FR] France ............................ 84 19963

[51] Int. Cl.$^4$ .......................... G01S 15/89; G01S 7/52
[52] U.S. Cl. .................................................. 367/88
[58] Field of Search ........................................ 367/88

[56] References Cited

U.S. PATENT DOCUMENTS 4,232,380 11/1980 Caron et al. ........................ 367/88

Primary Examiner—Richard A. Farley
Attorney, Agent, or Firm—Antonelli, Terry & Wands

[57] ABSTRACT

A method and device for improving the restoration of the images obtained from samples taken from acoustic signals received by a lateral aimed sonar provides for the selection of samples from the signals received, the time interval between the samples selected being smaller at the beginning of the echo reception window than at the end thereof so as to improve the power of resolution of the sonar for directions of low obliqueness. The sampling may be carried out at a variable frequency or else at a very high fixed frequency, the selection then being made among all the samples obtained.

7 Claims, 6 Drawing Figures

4,675,853

METHOD OF IMPROVING THE RESTORATION OF IMAGES SUPPLIED BY A LATERAL SONAR AND A DEVICE FOR IMPLEMENTING SAME

BACKGROUND OF THE INVENTION

1. Field of the Invention

The invention relates to a method of improving the restoration of images supplied by a side looking sonar and in particular a sonar comprising a digital acquisition chain.

2. Description of the Prior Art

Lateral aimed sonars are, it will be recalled, sonars having acoustic transmitting-receiving transducers fixed to the hull of a ship or better still to the hull of a streamlined body or "fish" towed immersed by the ship, and whose main transmitting-reception axes are orientated in oblique directions in a transverse plane perpendicular to the path of a ship.

For transmission-reception a plurality of transducers are aligned in a direction parallel to the longitudinal axis of the ship or fish, so that their directional patterns have a small opening angle on each side of the vertical transverse plane and a wider opening angle in this same plane.

The transmitting transducers are fed at regular intervals and send acoustic pulses in an oblique direction towards the bottom of the water. These pulses irradiate or insonifie sea bed on one side or on both sides of the ship or fish over a narrow strip of elongate shape perpendicular to the direction of travel and are backscattered to the surface.

The receiving transducer or transducers, because of their directional pattern, are adapted for picking up preferably the echoes coming from the irradiated strips.

The signals received by the transducers, echoes of the transmitted pulses, are amplified preferably with an amplification gain increasing with time for correcting the amplitude variations due to the obliqueness of the propagation paths, then demodulated so as to obtain low frequency signals representative of the envelope of the signals received.

The demodulated signals are recorded and obliqueness corrections, taking into account the water height under the boat, are made to the recordings so as to obtain a linear representation of the sea bed.

The images which are obtained of the surface of the sea bed are in general unsatisfactory in so far as the zones corresponding to a small obliqueness of the acoustic paths are concerned. That is due in particular, as will be seen in greater detail in the description, to the fact that the transverse dimensions of the surface portions reflecting the echos received during the same time interval are much larger at the beginning of each reception phase, i.e. for the directions close to the vertical than for the directions more slanted with respect thereto, and consequently to the low transverse resolution power for the near zones.

In sonars comprising a digital acquisition chain, this time interval is for example the period (or pitch) at which the demodulated signals are sampled.

The method of the invention overcomes the above mentioned drawbacks.

SUMMARY OF THE INVENTION

The method of the invention applies to the improvement of images obtained during successive transmission and reception cycles comprising the transmission of acoustic pulses laterally and obliquely towards the surface above which the sonar is advancing, the reception of acoustic signals reflected by the surface, sampling thereof and digitization of the samples obtained.

It is characterized in that it comprises the selection of samples from the acoustic signals, the time intervals separating any two selected successive samples increasing during the reception step.

The sampling period is determined for example as a function of the water height and the propagation time, so that the spatial distribution of the elements of the surface of the sea bed corresponding to the selected signal samples is homogeneous over the whole reflecting surface restored by the images.

BRIEF DESCRIPTION OF THE DRAWINGS

The advantages provided by the method of the invention and the features of the device for implementing same will be clear from reading the description of embodiments given by way of non limitative examples with reference to the accompanying drawings in which.

DESCRIPTION OF THE PREFERRED EMBODIMENTS

Images of the sea bed, on one side at least of the path followed by a ship 1 (FIG. 1), are obtained by immersing a streamlined body 2 having laterally at least one directional transducer 3 adapted for transmitting and receiving ultrasounds, whose axis is orientated in a transverse plane and obliquely with respect to the vertical. The directivity pattern of this transducer comprises a very narrow main lobe on each side of the transverse plane and fairly open in this same plane.

The values of the angles at the apex of the main beams transmitted and received in the longitudinal plane and in the transverse plane respectively are for example 1° to 5° and 30° to 60°, so that the surface of the sea bed irradiated or insonified by each acoustic pulse transmitted is a fairly narrow transverse strip I.

Acoustic pulses are transmitted periodically. The acoustic waves are reflected by the sea bed and are picked up by antenna 3. The echoes coming from directions of low obliqueness arrive first. Following them arrive the echoes coming from directions of increasing obliqueness.

As will be seen hereafter in the description of the device for implementing the method of the invention, the signals translating the echoes received are suitably amplified and, after detection of their envelopes, are recorded.

Recording is carried out conventionally by taking samples of the detected envelopes, digitizing them and storing the digital words obtained in a storage means. The samples are taken at a constant sampling frequency $f_H$.

Figure 1:
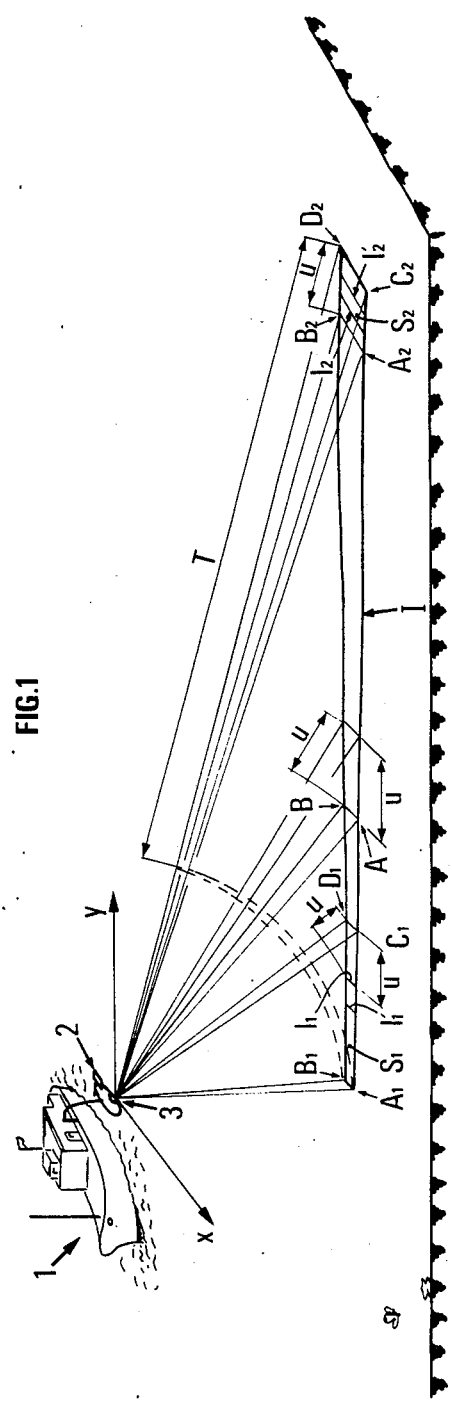
FIG. 1 shows schematically a side looking sonar and the arrangement of its transmission and reception beams.

It can be seen in FIG. 1 that the echoes received during the same time intervals u have been reflected by different surface portions depending on the position of this interval in the reception window of duration T.

The area $A_1$, $B_1$, $C_1$, $D_1$, of the surface portion $S_1$ corresponding to directions of low obliqueness is larger for example than the area $A_2$, $B_2$, $C_2$, $D_2$, of the surface portion $S_2$ corresponding to very slanted paths.

Thus, two surface lines $(L_1, L'_1)$, $(L_2, L'_2)$ corresponding to any two successive samples are unequally spaced apart from each other depending on their positions in the reflecting surface.

The resolution power of the sonar varies consequently in considerable proportions. It is relatively low for the nearest reflecting surface zones.

With the method of the invention, by varying the sampling period $\tau(\tau=1/f_H)$, the intervals between the ground lines which correspond to the selected samples may be maintained substantially equal, whatever the time of taking the samples in the reception window T and whatever the water height H.

Figure 2:
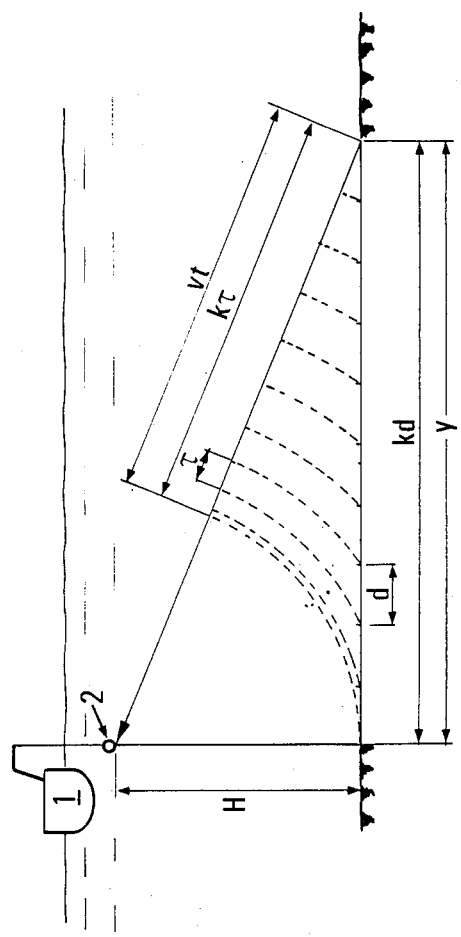
FIG. 2 shows the geometric relation between the times of taking the successive samples and the surface elements of the sea bed corresponding to the samples taken.

The lateral distance y of a point of the reflecting surface with respect to the vertical depends (FIG. 2) on the water height H, on the propagation time and on the speed of propagation v of the acoustic waves by a relationship of the type:

$$H^2 + Y^2 = (H + vt)^2 \quad (1)$$

With the propagation time equal to a number k of sampling intervals and with the lateral distance y equal to the same number k of spacings of values d, the relationship (1) can be further expressed in the form:

$$H^2 + k^2 d^2 = v^2 k^2 \tau^2 \quad (2)$$

A simple calculation shows that in order to obtain constant spacings d, the sampling period must vary as a function of the order number k of samples taken, in agreement with the relationship:

$$\tau = (1/v)[(H^2/k^2) + d^2]^{\frac{1}{2}} - (H/vk) \quad (3)$$

The method may be put into practice by varying the sampling time interval as a function of time, so as to follow exactly the relationship 3. The method may also be put into practice by adjusting the time interval by steps so as to follow approximately the relationship 3, the adjustment step depending on the accuracy required for restoration of the images.

Figure 3:
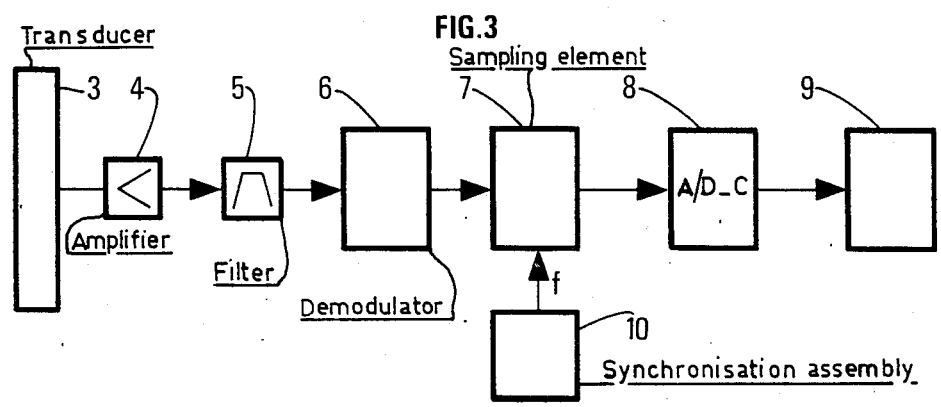
FIG. 3 shows a block diagram of a reception chain of a side looking sonar.

The device for implementing the method is associated with a sonar signal reception chain comprising (FIG. 3) an amplifier 4 whose gain increases from the beginning of the reception window of the echoes, so as to take into account the attenuation of the acoustic waves as a function of the propagation time. Amplifier 4 is connected to the input of a band pass filter 5 centered on the preponderant frequency of the signals received.

The output of filter 5 is connected to a demodulation assembly 6 adapted for delivering signals representative of the envelope of the echos received.

A sampling element 7 is connected to the output of the demodulation assembly 6. The signal samples produced are then digitized in an analog-digital converter 8 then transferred to a storage element 9.

The operation of the sampling elements 7 is timed by a clock signal supplied by a synchronization assembly 10.

Figure 4:
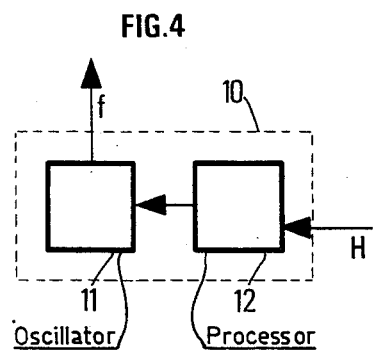
FIG. 4 shows a block diagram of a first embodiment of the device for implementing the method of the invention.

In a first embodiment (FIG. 4), the clock signal is generated by an oscillator 11 of VCO type, controlled by the voltage delivered by a processor 12. An auxiliary sonic depth finder (not shown) supplies the values of the water height H to the processor 12 which determines the voltage to be applied to oscillator 11 so as to obtain substantially constant spacings d.

Figure 5:
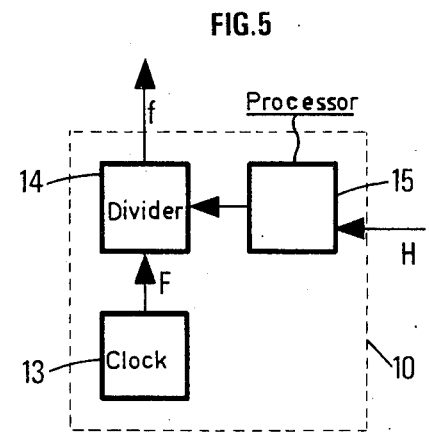
FIG. 5 shows a block diagram of a second embodiment of the device.

In a second embodiment (FIG. 5), the synchronization assembly 10 comprises a clock 13 producing a reference signal whose frequency f is a high multiple of the mean sampling frequency $f_H$. The clock signal is applied to divider elements 14 whose factor of division may assume a plurality of different values. Selection of the appropriate value is determined by a processor 15 as a function of the propagation time and the water height H.

Figure 6:
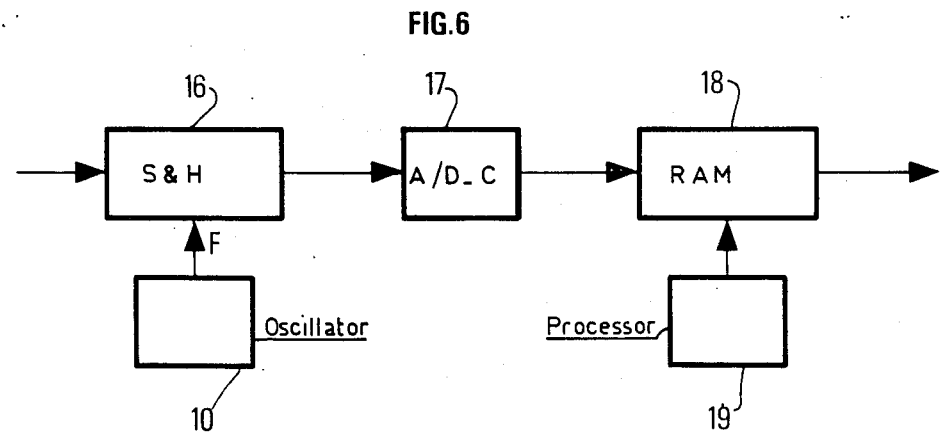
FIG. 6 shows a block diagram of a third embodiment of the device.

In a third embodiment (FIG. 6), the synchronization assembly comprises an oscillator 10 producing a reference signal whose frequency f is very much greater than the sampling frequency required for obtaining recordings with a satisfactory power of resolution. The clock signal f is applied directly to a sample and hold unit 16. The samples taken at frequency f are all digitized by an analog-digital converter 17 and stored in a storage means such as a random access memory 18 (RAM).

The synchronization assembly also comprises a programmable processor 19 which is coupled to the RAM 18. The selection, among the stored samples, of those which will serve for forming the images is effected by a processor 19 as a function of the propagation time and the water height H. The time intervals between the samples effectively selected will be multiples of the period of the reference signal.

In a variant of construction, processor 19 selects the assembly of samples which are to serve for forming the images directly at the output of the sample and hold unit 16 and controls application thereof to the analog-digital converter 17.

What is claimed is:

1. In a process for improving the restoration of images supplied by a side-looking sonar, said images being obtained during successive transmission and reception cycles comprising the steps of emitting acoustic pulses laterally and in an oblique direction towards a surface above which the sonar is advancing, receiving the acoustic signals reflected by said surface, sampling received acoustic signals and digitization thereof, and selecting samples from the acoustic signals, the sampling period separating any two selected successive samples increasing during the receiving step.

2. The process as claimed in claim 1, wherein said sampling period is determined as a function of the water height under said sonar and of the propagation time so that the spatial distribution of the surface elements corresponding to the selected signal samples is homogeneous over the whole surface reflecting the acoustic signals, restored by the images.

3. A device for improving the restoration of images produced by a side-looking sonar, which comprises acoustic pulse transmission means for transmitting acoustic signals, means for receiving the acoustic signals reflected by a surface above which the sonar is passing, sampling means for obtaining from the reflected acoustic signals a series of samples, means for digitizing said samples, storage means for storing the digitized samples, and synchronization assembly for generating a clock signal for driving said sampling means and for selecting a part at least of the samples taken by the sampling means, the selected samples being separated by increasing time intervals.

4. The device as claimed in claim 3 wherein said synchronization assembly comprising means for generating a clock signal whose frequency decreases during time, all the signal samples from the sampling means being digitzed and stored.

5. The device as claimed in claim 3, wherein said synchronization assembly comprises a variable frequency oscillator whose oscillation frequency depends on a control voltage and means for generating said control voltage which will cause the oscillation frequency of the oscillator to decrease as a function of time and as a function of the water height under the sonar.

6. The device as claimed in claim 3, wherein said synchronization assembly comprises a fixed frequency oscillator providing a clock signal, divider means for generating a plurality of signals whose frequencies are submultiples of the frequency of said clock signal and means for successively selecting from the signals generated by the divider element signals whose frequency decreases in steps during the reception of the reflected acoustic signals.

7. The device as claimed in claim 3, in which the synchronization assembly comprises an oscillator generating a fixed frequency clock signal, sample and hold means for taking samples of the signals at a frequency imposed by said clock signal, and means for taking, from all the signal samples delivered by the sample and hold means during each reception of acoustic signals, samples separated by increasing time intervals whose values are determined as a function of the propagation time and of the water height under the sonar.

* * * * *